Patented Aug. 6, 1929.

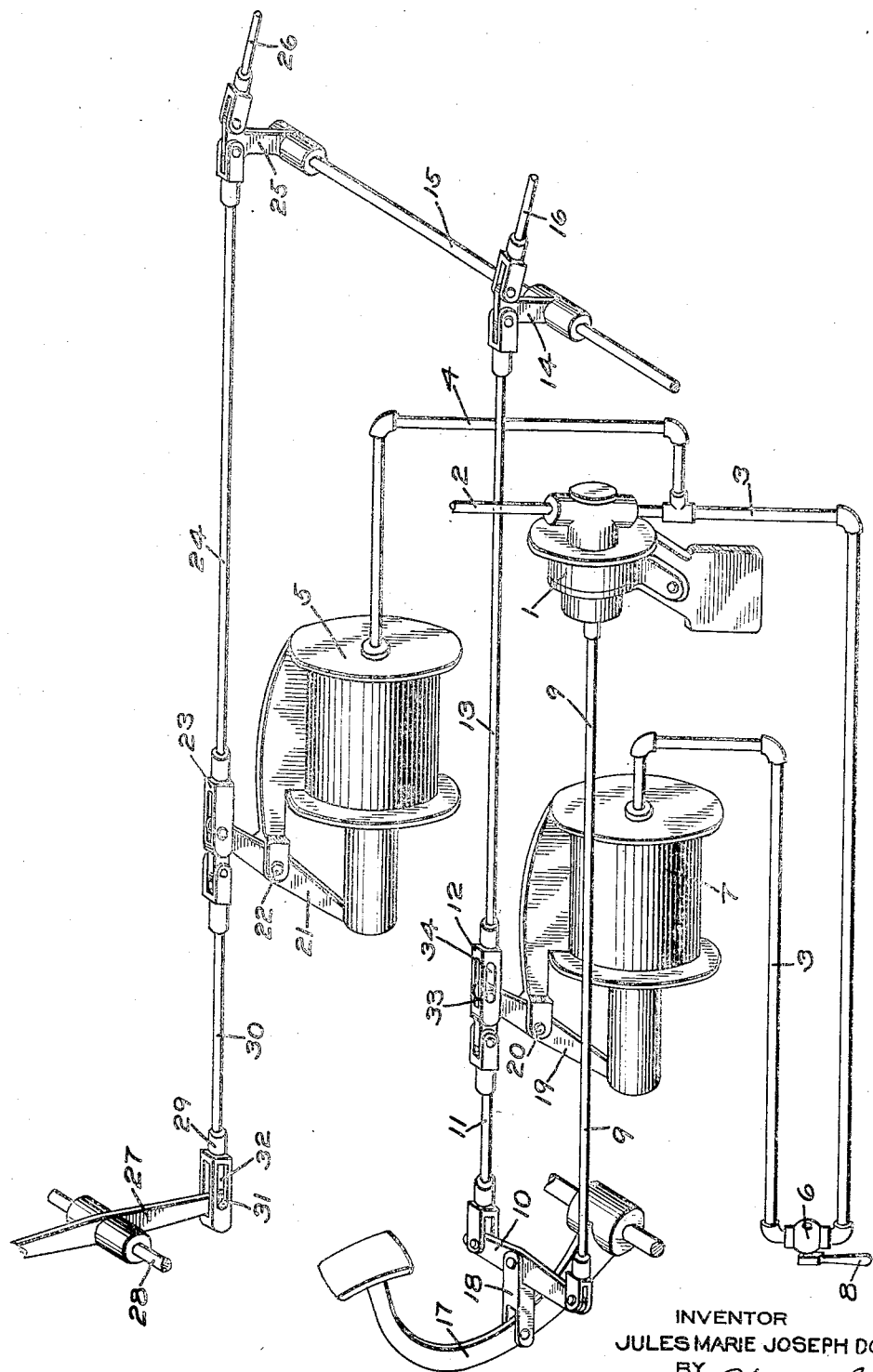

1,723,140

UNITED STATES PATENT OFFICE.

JULES MARIE JOSEPH DORMOY, OF PARIS, FRANCE, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE EQUIPMENT.

Application filed November 25, 1927, Serial No. 235,462, and in France April 2, 1927.

This invention relates to brakes more particularly adapted for use on automotive vehicles.

The principal object of my invention is to provide a brake apparatus for an automotive vehicle, in which the degree of braking power can be varied according as the vehicle is empty or loaded.

In the accompanying drawing, the single figure is a diagrammatic view of an automotive brake equipment embodying my invention.

In the construction shown in the drawing, my invention is illustrated as applied to an automotive brake apparatus of the vacuum type, although the invention is not limited to such application. The apparatus shown comprises a distributing valve device 1 of any desired type, adapted to control communication from a pipe 2, which is preferably connected to the suction manifold of the internal combustion engine, to a pipe 3 which is connected to a pipe 4 leading to an empty brake cylinder 5.

Pipe 2 is also connected through a cock 6 with a load brake cylinder 7, and cock 6 may be operated manually by means of a handle 8, as shown, or automatically according to the load on the car.

The distributing valve device 1 may be operated by a rod 9 which is connected to one end of an equalizing lever 10. The other end of the lever is connected through a link rod 11 and a member 12 with a rod 13, the rod 13 being pivotally connected to an arm 14, secured to a shaft 15. A rod 16 is also pivotally connected to said arm and is operatively connected to operate the brakes of the vehicle.

A pedal lever 17 is connected through a link 18 to the middle portion of the lever 10 and a brake lever 19 fulcrumed at 20 is pivotally connected to the member 12 at one end and at the other end is operatively connected to the usual piston (not shown) which is contained in the brake cylinder 7.

A brake lever 21, fulcrumed at 22, is operatively connected at one end to the usual piston (not shown) contained in brake cylinder 5 and the other end is pivotally connected to a member 23 carried by a rod 24. Said rod is pivotally connected to an arm 25 secured to the shaft 15 and a brake operating rod 26 is also pivotally connected to said arm. A hand brake lever 27, fulcrumed on a shaft 28, is operatively connected to a member 29 secured to one end of a rod 30, the other end of the rod being connected to the member 23. The connection of lever 27 to member 29 is by way of a pin 31 working in a slot 32 provided in the member 29 and the connection of brake lever 19 to the member 12 is through a pin 33 working in a slot 34 of said member.

When the vehicle is loaded, the handle 8 of the cock 6 is turned so that communication through the pipe 3 to the load brake cylinder 7 is opened and to apply the brakes, the pedal lever 17 is depressed and the equalizing lever 10 is operated, so that pressure is transmitted through rods 11 and 13 to the arm 14, so that the shaft 15 is rotated to cause the rods 16 and 26 to act on the usual brake shoes so as to cause the brake shoes to engage the brake drum and then continued pressure on the brake pedal causes the movement of the rod 9, whereby the distributing valve device 1 is operated to connect the vacuum pipe 2 with the pipe 3. A vacuum is thus created on one side of the pistons in the brake cylinders 5 and 7, so that the atmospheric pressure acting on the opposite sides of said pistons pushes the pistons toward the right. The brake levers 19 and 21 are then actuated to apply the brakes by the pull exerted on the rods 9 and 24.

If the vehicle is empty, the handle 8 is operated to turn the cock 6 to its empty position, in which communication through the pipe 3 to the load brake cylinder 7 is cut off. Under this condition, when the brakes are applied by pressing the pedal lever 17, a vacuum is created only in the empty brake cylinder 5.

When the load brake cylinder 7 is cut out, and the brakes are applied, movement of the rod 13 relative to the pin 33 is permitted by reason of the slot 34. In a similar manner, movement of the rod 30 due to the brakes being applied pneumatically is permitted by reason of the slot 32 in which the pin 31 works. The brakes may also be independently applied by pulling on the hand lever 27 so as to operate the brakes through a pull on the rods 30 and 24.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In an automotive brake, the combination with a brake cylinder, of means for controlling the fluid pressure in said cylinder, a foot operated member for operating said means, a second brake cylinder, and means operable to establish communication between said brake cylinders.

2. In an automotive brake, the combination with a brake cylinder, of means for controlling the fluid pressure in said cylinder, a foot operated member for operating said means, a second brake cylinder, and manually controlled means operable to establish communication whereby the fluid pressure in the second cylinder is varied when the fluid pressure in the first brake cylinder is varied.

3. In an automotive brake, the combination with an empty brake cylinder and a load brake cylinder, of means for controlling the fluid pressure in said cylinders, a foot operated member for operating said means, and means operable to cut off communication through which the fluid pressure in the load brake cylinder is varied.

4. In an automotive brake, the combination with a braking element, of an empty brake cylinder operatively connected to said element, a load brake cylinder operatively connected to said element, means for varying the fluid pressure in said brake cylinders, and a foot operated member for operating said means.

5. In an automotive brake, the combination with a braking element, of an empty brake cylinder operatively connected to said element, a load brake cylinder operatively connected to said element, means for varying the fluid pressure in said brake cylinders, and a foot operated member for operating said means and operatively connected to said braking element.

6. In an automotive brake, the combination with a braking element, of an empty brake cylinder operatively connected to said element, a load brake cylinder operatively connected to said element, means for varying the fluid pressure in said brake cylinders, a foot operated member for operating said means, and a hand operated member operatively connected to said braking element.

7. In an automotive brake, the combination with a braking element, of a rod operatively connected to said element, an empty brake cylinder operatively connected to said rod, a second rod operatively connected to said element, a load brake cylinder operatively connected to said rod, a foot operated member operatively connected to one rod, and a hand operated member operatively connected to the other rod.

8. In an automotive brake, the combination with a braking element, of a rod operatively connected to said element, an empty brake cylinder operatively connected to said rod, a second rod operatively connected to said element, a load brake cylinder operatively connected to said rod, means for varying the fluid pressure in said cylinders, a foot operated member operatively connected to one rod and adapted to operate said means, and a hand operated member operatively connected to the other rod.

In testimony whereof I have hereunto set my hand.

JULES MARIE JOSEPH DORMOY.